United States Patent
Higuchi et al.

(10) Patent No.: US 8,977,471 B2
(45) Date of Patent: Mar. 10, 2015

(54) CONTROLLER FOR INTERNAL COMBUSTION ENGINE

(75) Inventors: Kazuhiro Higuchi, Ichinomiya (JP); Koji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 748 days.

(21) Appl. No.: 13/252,436

(22) Filed: Oct. 4, 2011

(65) Prior Publication Data
US 2012/0083994 A1 Apr. 5, 2012

(30) Foreign Application Priority Data
Oct. 5, 2010 (JP) .................. 2010-226035

(51) Int. Cl.
*F02D 41/30* (2006.01)
*F02D 41/00* (2006.01)
*F02D 19/08* (2006.01)
*F02D 19/06* (2006.01)

(52) U.S. Cl.
CPC .......... *F02D 41/0025* (2013.01); *F02D 19/088* (2013.01); *F02D 41/0087* (2013.01); *F02D 2200/0612* (2013.01); *F02D 2200/101* (2013.01); *Y02T 10/36* (2013.01); *F02D 19/0649* (2013.01); *F02D 19/084* (2013.01)
USPC .......................................... 701/103; 123/436

(58) Field of Classification Search
CPC ......... F02D 43/00; F02D 41/04; F02D 45/00; F02D 41/00; F02D 41/30
USPC .................................. 701/103; 123/436, 478
See application file for complete search history.

(56) References Cited

U.S. PATENT DOCUMENTS

2006/0293828 A1 12/2006 Ishizuka et al.
2009/0198456 A1 8/2009 Tsutsumi et al.

FOREIGN PATENT DOCUMENTS

| JP | 58107826 A | * | 6/1983 | ................ F02D 5/02 |
| JP | 9-14015 | | 1/1997 | |
| JP | 2006-16994 | | 1/2006 | |
| JP | P2007-127007 A | | 5/2007 | |
| JP | P2008-95581 A | | 4/2008 | |

OTHER PUBLICATIONS

Japanese Office Action dated Sep. 4, 2012, issued in corresponding Japanese Application No. 2010226035 with English translation.
Office Action (6 pages) dated Dec. 2, 2013, issued in corresponding Chinese Application No. 201110301781.4 and English translation (4 pages).

* cited by examiner

*Primary Examiner* — Stephen K Cronin
*Assistant Examiner* — Xiao Mo
(74) *Attorney, Agent, or Firm* — Nixon & Vanderhye, P.C.

(57) ABSTRACT

A multicylinder engine is provided with a fuel injector for each cylinder. An ECU defines a fuel injection condition of the fuel injector based on an engine driving condition and executes a fuel injection control for each cylinder based on the defined fuel injection condition. The ECU computes an engine speed with respect to each cylinder. While the engine is running, the fuel injection condition is operated in an operation cylinder. A fuel property is determined based on the engine speed of the operation cylinder and an engine speed of a non-operation cylinder.

8 Claims, 5 Drawing Sheets

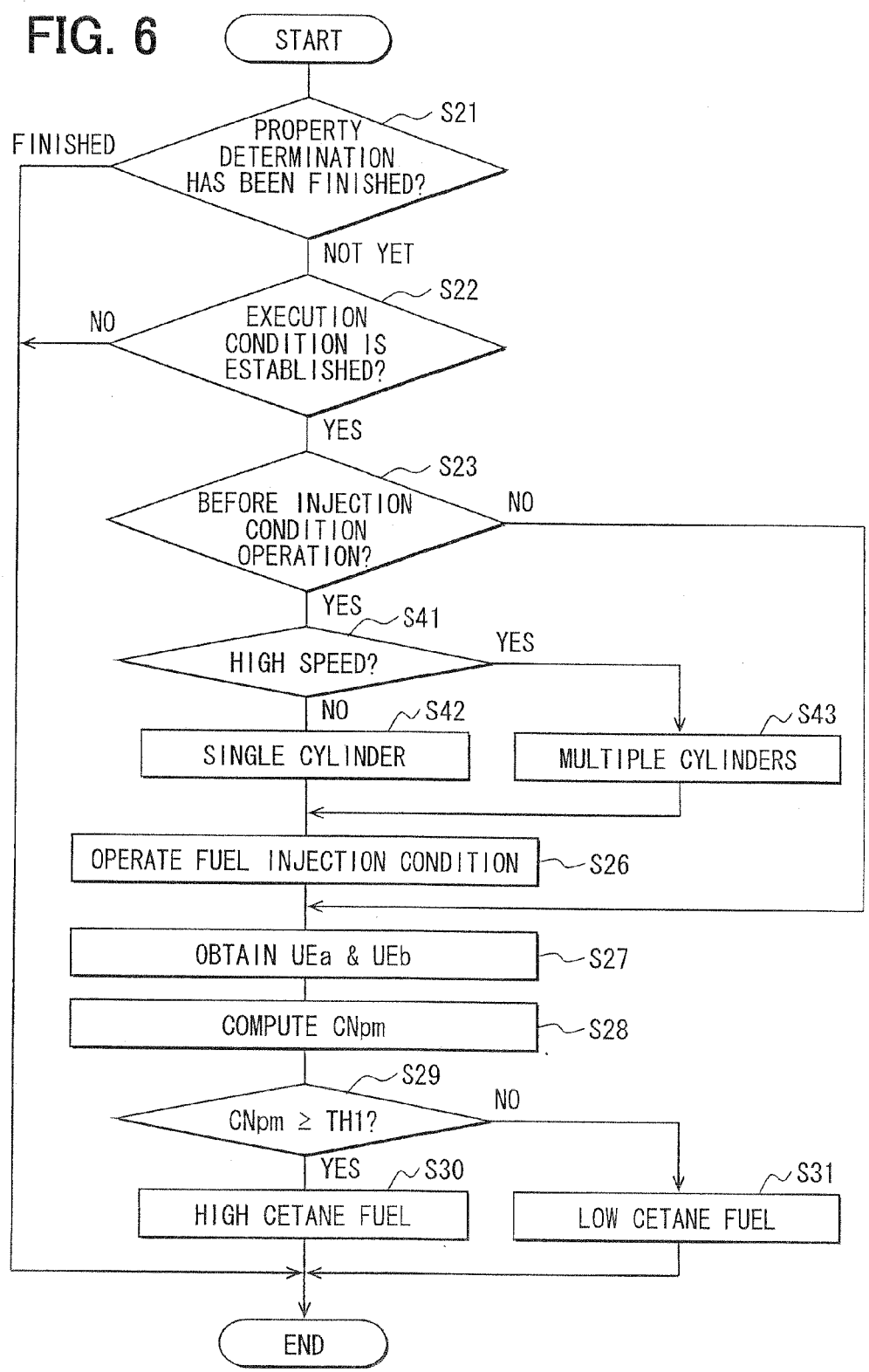

CONTROLLER FOR INTERNAL COMBUSTION ENGINE

CROSS-REFERENCE TO RELATED APPLICATION

This application is based on Japanese Patent Application No. 2010-226035 filed on Oct. 5, 2010, the disclosure of which is incorporated herein by reference.

FIELD OF THE INVENTION

The present invention relates to a controller for an internal combustion engine, which determines property of fuel used for the internal combustion engine.

BACKGROUND OF THE INVENTION

It is well known that a combustion condition of an internal combustion engine varies according to fuel property (for example, cetane value). When an actual fuel property is largely different from a predetermined fuel property, it is likely that a combustion condition of the internal combustion engine becomes unstable, so that emission and fuel economy may be deteriorated.

JP-2006-16994A shows that a combustion condition such as ignition timing is detected by a combustion pressure sensor and the fuel property is detected based on this detected ignition timing. JP-2009-180174A (US-2009-0198456A1) shows that a small quantity of fuel is injected while a vehicle is decelerated, and the fuel property is detected based on a variation in engine speed due to the small injection.

However, in JP-2006-16994A, it is unclear whether an ignition timing retard is caused by a combustion condition or other reason. It is likely that the cetane value can not be correctly obtained. For example, due to exhaust gas recirculation (EGR), a deviation in ignition timing due to a difference in fuel property can not be obtained with high accuracy.

Also, in JP-2009-180174A, since the fuel property is detected only when the vehicle is decelerated, the detection frequency of the fuel property is relatively low. In order to improve the detection accuracy, it is necessary to increase the detection frequency. If the fuel is injected to detect the fuel property while the vehicle is not decelerated, it is likely that drivability may be deteriorated.

SUMMARY OF THE INVENTION

The present invention is made in view of the above matters, and it is an object of the present invention to provide a controller for an internal combustion engine, which is able to determine fuel property accurately without deterioration in drivability.

According to the present invention, a controller for an internal combustion engine is applied to a fuel injection system in which a fuel injector injects fuel into each cylinder of a multicylinder engine. The controller defines a fuel injection condition of the fuel injector based on a driving condition of the engine and executes a fuel injection control based on the defined injection condition with respect to each cylinder. The controller includes a computing means for computing an engine speed, which varies according to fuel combustion, with respect to each cylinder. The controller includes an operating means for operating the fuel injection condition in an operation cylinder, which is a part of the cylinders, in such a manner as to be different from the fuel injection condition in a non-operation cylinder other than the operation cylinder while the engine is running. Further, the controller includes a determining means for determining a fuel property, when the operating means operates the fuel injection condition, based on an engine speed computed by the computing means with respect to the operation cylinder and an engine speed computed by the computing means with respect to the non-operation cylinder.

A combustion condition varies according to cetane value of fuel or an alcohol concentration of alcohol mixed fuel. The engine speed varies due to the variation in combustion condition in each cylinder, whereby a difference in engine speed occurs. According to the present invention, a fuel injection condition is compulsorily varied by conducting an injection condition operation. Then, the fuel property is determined based on a variation in engine speed when the injection condition operation is conducted. It should be noted that the engine speed which varies due to fuel combustion in each cylinder can be computed based on a time period which is required for a crankshaft to rotate a specified angle. This engine speed is also referred to as an instant engine speed.

Since the fuel property is determined based on the engine speed of the operation cylinder and the engine speed of the non-operation cylinder, the fuel property can be determined based on a variation in engine speed due to the injection condition operation, referring to the engine speed of the non-operation cylinder. At this time, since the engine speed is obtained with respect to the operation cylinder and the non-operation cylinder under the same condition including disturbances, it is conceivable that the variation in engine speed is caused by the fuel property.

Further, since the operation cylinders are limited to a part of cylinders, the driving condition of the engine receives little influence even if the variation in the engine speed is generated in the specified cylinders. Therefore, while the fuel injection condition is compulsorily operated to determine the fuel property, it can be restricted that the engine driving condition is excessively varied. As above, while restricting a deterioration in drivability, the fuel property can be suitably determined.

Alternatively, according to the present invention, the fuel property can be determined based on a cylinder torque of each cylinder, which is estimated from the engine speed of each cylinder. Further, the injection condition operation includes an operation for varying a fuel injection timing of the injector, an operation for varying a fuel injection quantity, and an operation for varying an injection pattern of multi-fuel injections.

BRIEF DESCRIPTION OF THE DRAWINGS

Other objects, features and advantages of the present invention will become more apparent from the following description made with reference to the accompanying drawings, in which like parts are designated by like reference numbers and in which:

FIG. 6 is a flowchart showing a fuel property determination processing according to other embodiment.

DETAILED DESCRIPTION OF EMBODIMENTS

Figure 1:
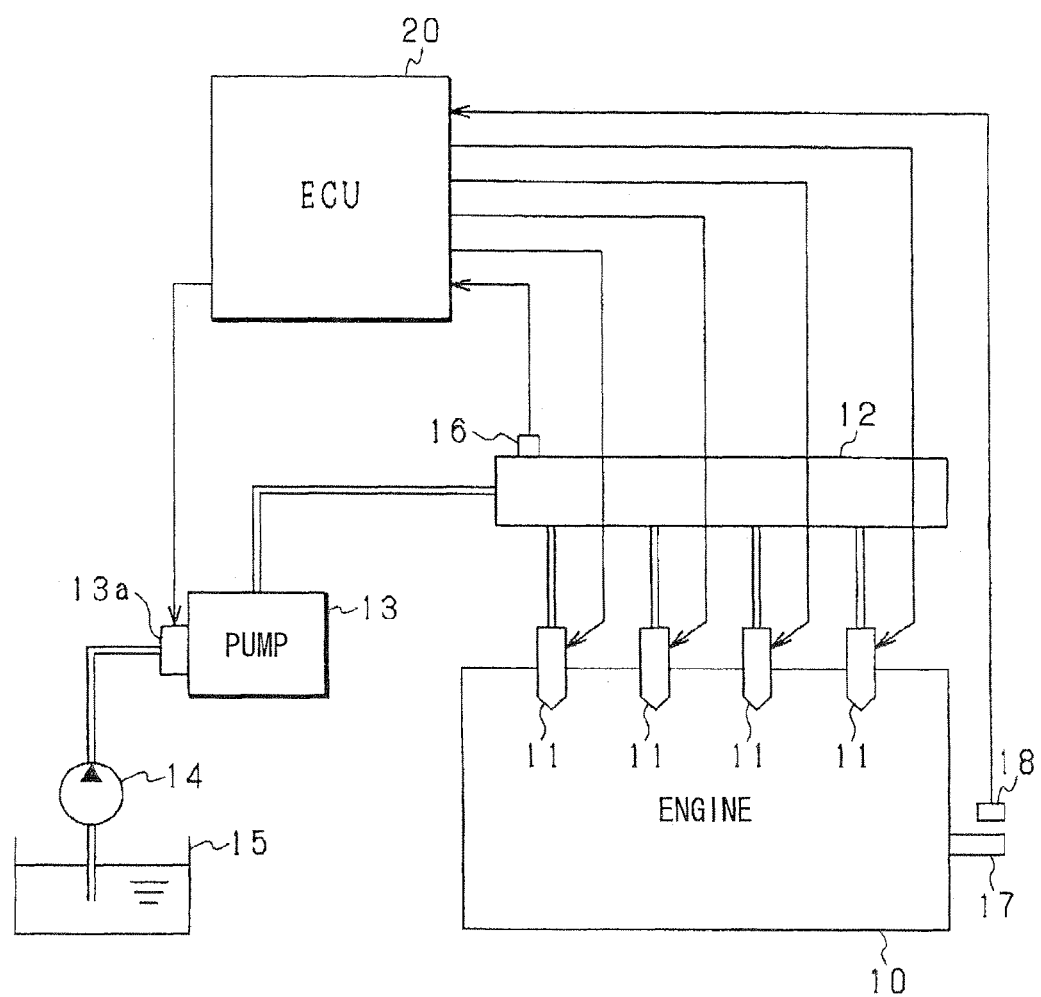
FIG. 1 is a construction view schematically showing a common rail type fuel injection system in an embodiment of the invention.

Hereafter, an embodiment of the present invention is described. This embodiment has embodied the present invention as a common-rail fuel injection system of a multi-cylinder diesel engine for a vehicle, and the detailed configuration will be described below. FIG. 1 is a schematic view showing a common-rail fuel injection system.

A four-cylinder diesel engine 10 has a fuel injector 11 to each cylinder. The fuel injectors 11 are connected to a common-rail (accumulator) 12. The common-rail 12 is connected to a high-pressure pump 13 which supplies high-pressure fuel thereto. The high-pressure pump 13 is driven by the engine 10. The high-pressure pump 13 is provided with a suction control valve (SCV) 13a through which the fuel pumped up from a fuel tank 15 by a feed pump 14 is introduced into a fuel chamber of the pump 13.

The common-rail 12 is provided with a pressure sensor 16 which detects a fuel pressure in a common-rail 16, which is referred to as common-rail pressure. Further, the common-rail 12 is provided a pressure reduction valve (not shown). When the common-rail pressure is excessively increased, the pressure reduction valve is opened to release the common-rail pressure.

A rotation speed sensor 18 is disposed at a vicinity of a crank shaft 17 of the engine 10 to detect to rotation speed of the crank shaft 17. The rotation speed sensor 18 is a pickup sensor, which outputs pulse engine speed signals (NE pulse). In the present embodiment, the NE pulse is outputted every 6° CA.

An electronic control unit (ECU) 20 includes a microcomputer having a CPU, a ROM, a RAM, and an EEPROM. The ROM stores a various control programs therein. The ECU 20 receives various detection signals from the above sensors. The ECU 20 computes a fuel injection quantity and a fuel injection timing based on the engine driving information including an engine speed, an accelerator position and the like. Then, the ECU 20 outputs an injection control signal to the fuel injector 11. In the present embodiment, a multi-fuel injection is performed. The multi-fuel injection includes a main injection, a pilot injection and an after injection.

The ECU 20 feedback-controls the fuel pressure according to current engine driving condition. Specifically, the ECU 20 computes a target common-rail pressure based on the engine driving condition, and controls the SCV 13a so that the common-rail pressure detected by the pressure sensor 16 agrees with the target common-rail pressure.

Figure 2:
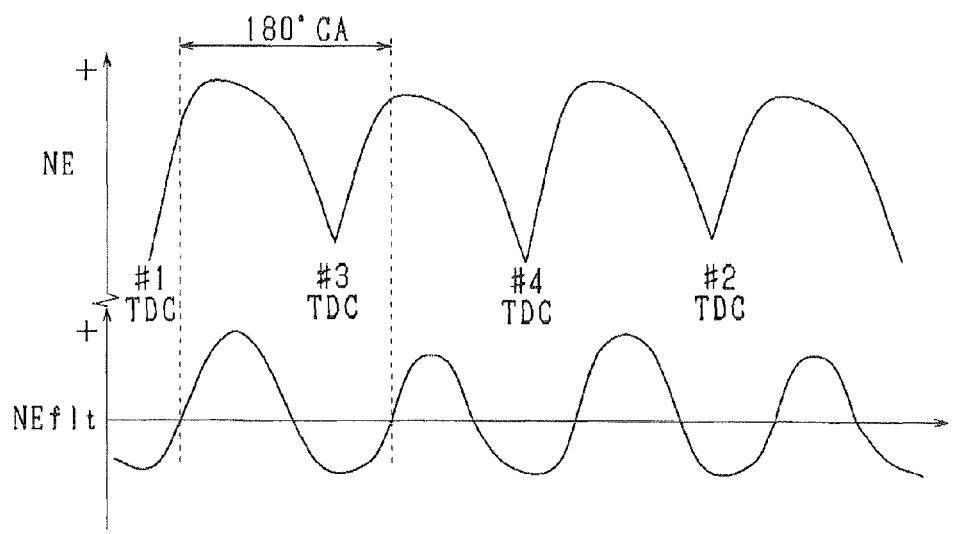
FIG. 2 is a time chart showing a variation in engine speed and a variation in instant torque.

It should be noted that the engine speed NE varies according to fuel combustion in each cylinder. An increase and a decrease in engine speed NE are repeated according to each stroke in a combustion cycle. As shown in FIG. 2A, an order of power stroke in four cylinders is a first cylinder (#1), a third cylinder (#3), a fourth cylinder (#4), and a second cylinder (#2) in this series. The fuel injection is performed every 180° CA of the crankshaft 17. In one combustion cycle of a single cylinder, the engine speed NE is increased along with a fuel combustion and then the engine speed NE is decreased due to a load applied to the crankshaft 17. The engine speed NE shown in FIG. 2A is computed based on a time period which is required for a crankshaft 17 to rotate a specified angle (6° CA). This engine speed NE is referred to as an instant engine speed.

According to the present embodiment, in view of a variation in engine speed NE for each cylinder, a torque is estimated with respect to each cylinder according to the variation in engine speed. Specifically, a variation component of the engine speed NE is extracted as an instant torque NEflt by means of a band-pass filter (BPF). The engine speed NE computed based on the detection signal (NE pulse) of the engine speed sensor 18 includes noises and detection errors. The detection value of the engine speed NE disperses relative to an actual engine speed. The BPF removes high-frequency components and low-frequency components, whereby the instant torque NEflt has no dispersion. This instant torque NEflt(i) is expressed by a following formulas (1).

$$NEflt(i)=k1*NE(i)+k2*NE(i-1)+k3*NE(i-2)+k4*NEflt(i-1)+k5*NEflt(i-2) \quad (1)$$

In this formula (1), NE(i) is a current sampling value of the engine speed, and NE(i-1) and NE(i-2) represent previous sampling values. NEflt(i-1) and NEflt(i-2) represent previous instant torque, and "k1"-"k5" are constants.

The above formula (1) is obtained by discretizing a transfer function G (s) expressed by a following formula (2).

$$G(s)=2\zeta\omega s/(s^2+2\zeta\omega s+\omega^2) \quad (2)$$

wherein $\zeta$ represents an attenuation coefficient and $\omega$ represents a response frequency.

In the present embodiment, the response frequency $\omega$ is defined as a combustion frequency of the engine 10. Based on this, the constants "k1"-"k5" are also defined. The combustion frequency is an angular frequency which represents a number of combustion per a unit angle. In a case of a four-cylinder engine, the combustion cycle is 180° CA and its inverse number is defined as the combustion frequency.

The instant torque NEflt of each cylinder is integrated during a specified range from a top dead center (TDC). Based on the integrated instant torque, cylinder torque NEtrq#1-NEtrq#4 is computed with respect to each cylinder. In the present embodiment, the integrating specified range is defined from TDC to ATDC 90° CA. Alternatively, the integrating specified range is defined from TDC to ATDC 180° CA. The integrating specified range may be defined with respect to each cylinder. In the following description, the number of the cylinder is represented by "#i" and the cylinder torque NEtrq#1-NEtrq#4 are represented by NEtrq#i.

Further, according to the present embodiment, the fuel property is determined based on the cylinder torque NEtrq#i. Especially, while the engine 10 is running, a part of cylinders among all cylinders 10 are defined as operation cylinders. The fuel injection condition is operated (varied) in the operation cylinders with respect to the fuel injection condition in non-operation cylinders. When the fuel injection condition is operated in the operation cylinders, the fuel property is determined based on the cylinder torque NEtrq#i in the operation cylinders and the cylinder torque NEtrq#i in the non-operation cylinders. The above processing will be described in detail hereinafter.

Figure 3:
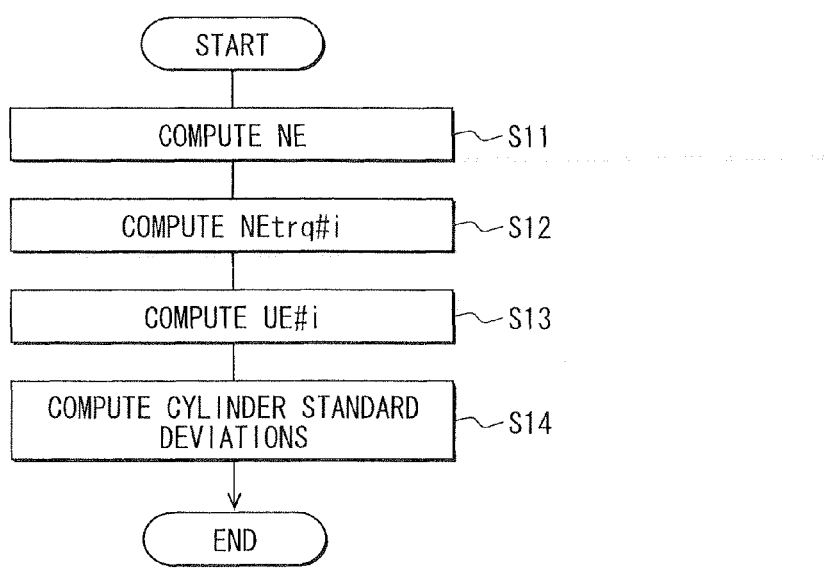
FIG. 3 is a flow chart showing a processing which is executed every when the NE pulse rises.

FIG. 3 is a flow chart showing a processing which is executed every when the NE pulse rises.

In step S11, the computer computes a pulse interval between the current NE sampling timing and the previous NE sampling timing. An inverse number of the pulse interval is defined as the engine speed NE (instant engine speed).

Then, in step S12, the engine speed NE of each cylinder is band-pass filtered and is integrated to compute the cylinder torque NEtrq#i. The cylinder torque NEtrq#i is computed based on a specified sampling number of the engine speed NE. Such a processing is executed while the engine is running, whereby the cylinder torque NEtrq#i is successively computed and is stored in a memory as history values.

In step S13, a dispersion UE#i in the cylinder torque NEtrq#i between each cylinder is computed based on a ratio between the computed cylinder torque NEtrq#i and an average of the cylinder torque NEtrq#i of all cylinders. Specifically, the dispersion UE#i is computed according to a following formula (3).

$$UE\#i = \frac{NEtrq\#i}{1/4 * \sum NEtrq\#i} \quad (3)$$

In the formula (3), the denominator corresponds to an average of the cylinder torque NEtrq#i of four cylinders in 720° CA. This dispersion UE#i is also stored in the memory as history values.

In step S14, the computer computes standard deviations (cylinder standard deviations $\sigma 1$-$\sigma 4$) which represent a dispersion range of the cylinder torque NEtrq#i of each cylinder. Specifically, an average value of the cylinder torque NEtrq#i in a specified range (for example, 30 cycles) is computed. A difference between the cylinder torque NEtrq#i and the average value is squared. A square root of an average value of the squared difference is obtained to compute the cylinder standard deviations $\sigma 1$-$\sigma 4$.

Instead of the standard deviations of the cylinder torque NEtrq#i, dispersions of the cylinder torque NEtrq#i (square of the standard deviation) can be used.

Figure 4:
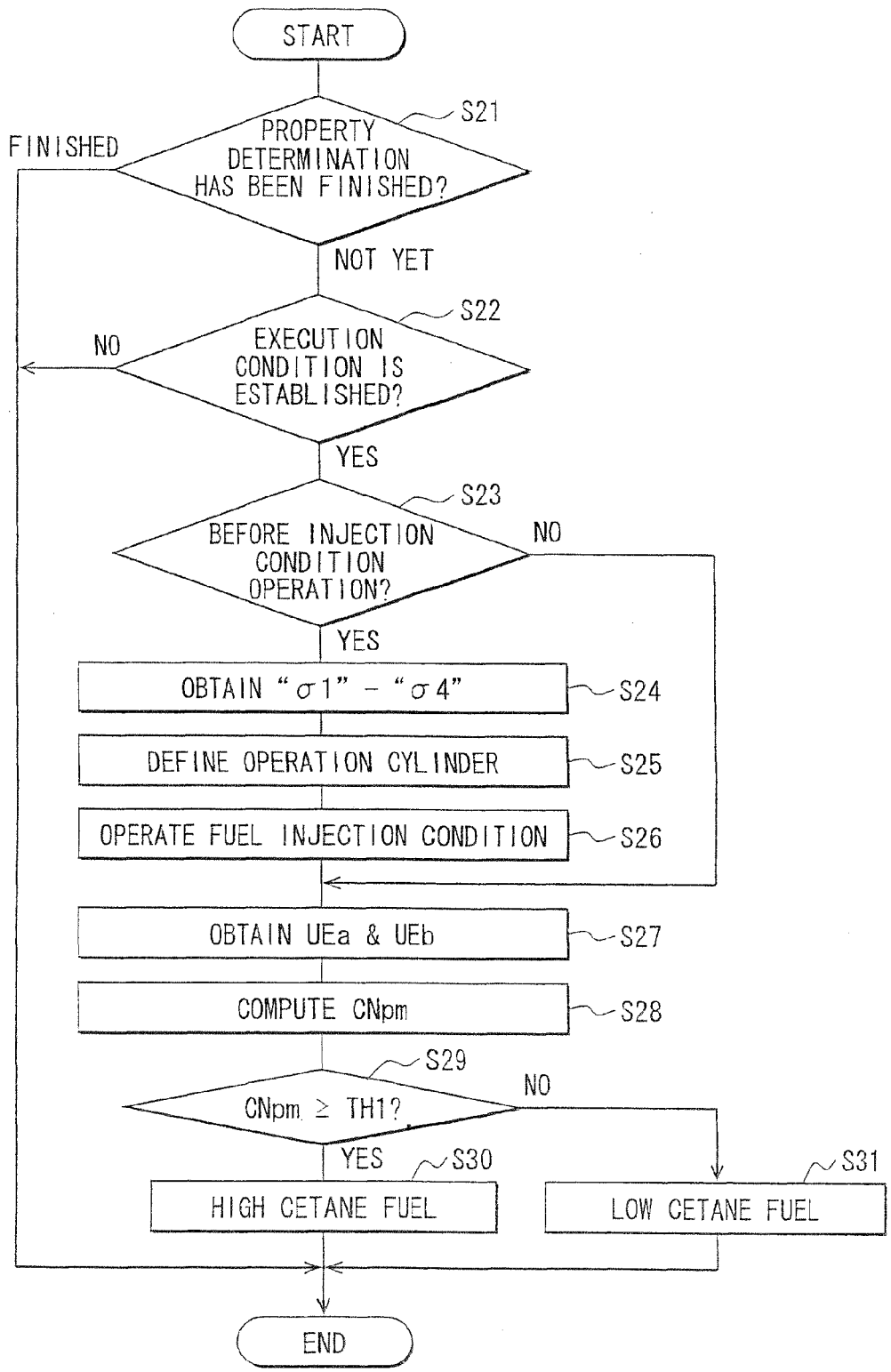
FIG. 4 is a flowchart showing a fuel property determination processing according to a first embodiment.

FIG. 4 is a flowchart showing a fuel property determination processing. The ECU 20 repeatedly executes the processing at specified intervals.

In step S21, the computer determines whether a fuel property determination has been already finished. In the present embodiment, when an ignition is turned on, the fuel property determination is executed. When the fuel property determination has not been finished yet, the procedure proceeds to step S22. Alternatively, when the fuel is refilled in a fuel tank, the fuel property determination may be executed. Further, after the fuel is refilled, the fuel property determination may be executed multiple times.

In step S22, the computer determines whether an execution condition is established for executing the fuel property determination. In the present embodiment, the computer determines whether an engine driving condition and other condition such as engine speed, fuel injection quantity, engine coolant temperature and intake air temperature are within specified conditions. When a variation in engine speed is lower than a specified value and a variation in fuel injection quantity is lower than a specified value, the computer determines that the engine is stable and the execution condition is established. If the engine speed is excessively high, an inertia force of engine rotation becomes large, so that a difference in generated torque between cylinders becomes small. Thus, an upper limit of the engine speed (for example, 4000 rpm) may be defined as the execution condition.

In step S23, the computer determines whether it is before an injection condition operation is started. If it is right after the execution condition is established in step S22, the answer in step S23 is YES and the procedure proceeds to step S24. In step S24, with respect to all cylinders, the cylinder standard deviations $\sigma 1$-$\sigma 4$ of the cylinder torque NEtrq#i are obtained. In step S25, based on the cylinder standard deviations $\sigma 1$-$\sigma 4$, the operation cylinders are defined, in which the fuel injection condition is operated. Specifically, the cylinders of which cylinder standard deviations are minimum value are defined as the operation cylinders. It should be noted that the cylinder standard deviations $\sigma 1$-$\sigma 4$ correspond to "dispersion of the cylinder torque computed from the engine speed".

In step S26, the fuel injection condition is operated in the operation cylinders. In the present embodiment, a main fuel injection timing of the fuel injector 11 is retarded as the injection condition operation. In this case, while an injection interval between the pilot injection and the main injection is fixed, the main fuel injection timing is retarded. For example, in a case that the operation cylinder is the first cylinder #1, with respect to the second to fourth cylinders #2-#4 as non-operation cylinders, the fuel injection timing is established based on the current engine driving condition such as the engine speed and the engine road. Further, with respect to the first cylinder #1, the fuel injection timing is retarded relative to the fuel injection timing of the second to fourth cylinders. In stead of retarding the main fuel injection timing, the main fuel injection timing may be advanced.

In step S27, the computer obtains the dispersion UEa in the cylinder torque NEtrq#i of the operation cylinder, which is computed at the time of the injection condition operation, and the dispersion UEb in the cylinder torque NEtrq#i of the operation cylinder, which is computed before the injection condition operation. These dispersion in the cylinder torque correspond to the computation value in step S13. In this case, the dispersion UEb is preferably computed in the same engine driving condition as the engine driving condition in the current injection condition operation.

It should be noted that each of the dispersions UEa and UEb corresponds to a comparison result between the cylinder torque NEtrq#i of the operation cylinders and the cylinder torque NEtrq#i of the non-operation cylinders. In step S27, the computer obtains a comparison result between the cylinder torque NEtrq#i of the operation cylinders and the cylinder torque NEtrq#i of the non-operation cylinder at time of the injection condition operation and before the time of the injection condition operation.

In step S28, according to the following formula (4), a property determination parameter CNpm is computed based on the dispersions UEa and UEb.

$$CNpm = UEa/UEb \quad (4)$$

Then, in steps S29-S31, the fuel property is determined based on the property determination parameter CNpm. If the fuel has high cetane value, the cylinder torque NEtrq#i is almost constant even if the injection condition operation is conducted. The difference in cylinder torque NEtrq#i is small between the operation cylinders and the non-operation cylinders. Meanwhile, if the fuel has low cetane value, the cylinder torque NEtrq#i is varied due to the injection condition operation. The difference in cylinder torque NEtrq#i is large between the operation cylinders and the non-operation cylinders. In view of the above, according to the present embodiment, a threshold TH1 is previously defined and the fuel property is determined by comparing the property determination parameter CNpm with the threshold TH1.

Figure 5A:
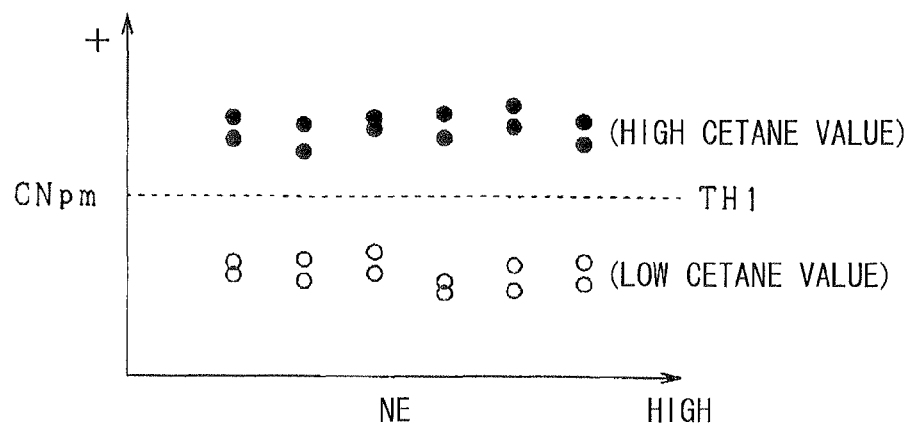
FIGS. 5A and 5B are graphs respectively showing a distribution of a property determination parameter CNpm.
Figure 5B:
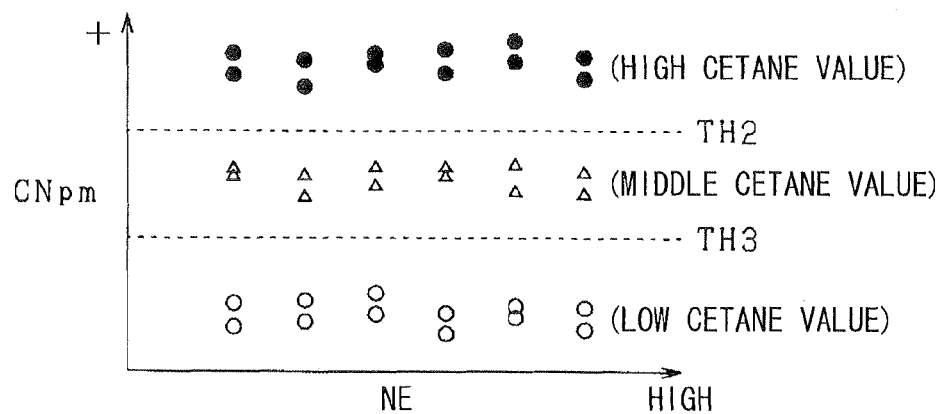

FIGS. 5A and 5B are graphs showing a distribution of the property determination parameter CNpm relative to the cetane value. FIG. 5A shows a case in which two types of fuel are used. One of fuel has high cetane value and the other fuel has low cetane value. As shown in FIG. 5A, each kind of fuel has almost constant value in the property determination parameter CNpm relative to the engine speed NE, respectively. The threshold TH1 is defined between the distributions of parameters CNpm for high cetane fuel and low cetane fuel. Thereby, based on the threshold TH1, it can be determined whether the fuel has high cetane value or low cetane value. Since the property determination parameter CNpm is almost equal to 1.0 in high cetane fuel, the threshold TH1 is less than 1.0 (for example, TH1=0.9).

In a case that the injection condition operation is conducted, the variation in the cylinder torque NEtrq#i depends on the engine driving condition. As the engine speed is higher, the variation becomes smaller. Thus, in a case that the fuel property is determined based on the variation in the cylinder torque NEtrq#i, the threshold should be varied between high engine speed and low engine speed. According to the present embodiment, the property determination parameter CNpm is computed based on the dispersion UE#i which corresponds to a ratio between the cylinder torque NEtrq#i of the operation cylinders and an average of all cylinder torque NEtrq#i (refer to the formulas (3) and (4)). Therefore, any influences of the engine driving condition are removed from the property determination parameter CNpm. As shown in FIG. 5A, the threshold TH1 can be constant value without respect to the engine speed.

Specifically, in step S29, the computer determines whether the property determination parameter CNpm is greater than or equal to the threshold TH1. When the answer is YES in step S29, the computer determines that the current fuel is high cetane fuel. When the answer is NO, the computer determines that the current fuel is low cetane fuel.

The threshold TH1 may be defined according to a kind of the fuel. FIG. 5B is a graph showing a case where three kinds of fuel are used. The first fuel has high cetane value, the second fuel has middle cetane value, and the third fuel has low cetane value. With respect to each fuel, a distribution in the property determination parameter CNpm is shown. A second threshold TH2 and a third threshold TH3 are defined. When CNpm TH2, the fuel is high cetane fuel. When TH3≤CNpm<TH2, the fuel is middle cetane fuel. When CNpm<TH3, the fuel is low cetane fuel.

According to the determination result of the fuel property, the engine is controlled to maintain suitable combustion condition. For example, when it is determined that low cetane fuel is used, (1) main fuel injection timing is advanced;
(2) pilot injection quantity is increased;
(3) number of fuel injection is changed; and/or
(4) EGR quantity is varied.

Thereby, even if the combustion is slow due to the low cetane fuel, the combustion condition can be improved.

According to the present embodiment, following advantages can be obtained.

While the engine 10 is running, the injection condition operation is conducted in a part of cylinders. Then, the fuel property is determined based on the cylinder torque NEtrq#i in the operation cylinders and the cylinder torque NEtrq#i in the non-operation cylinders. In this case, the cylinder torque NEtrq#i of the non-operation cylinders, specifically, an average of all cylinder torque NEtrq#i is defined as a reference. Based on the variation in cylinder torque NEtrq#i of the operation cylinders relative to the reference, the fuel property can be determined. Since the engine speed NE is obtained with respect to the operation cylinder and the non-operation cylinder under the same condition including disturbances, it is conceivable that the variation in engine speed is caused by the fuel property.

Further, since the operation cylinders are limited to a part of cylinders, the driving condition of the engine 10 receives little influence even if the variation in the engine speed is generated in the specified cylinders. Therefore, while the fuel injection condition is compulsorily operated to determine the fuel property, it can be restricted that the engine driving condition is excessively varied. As above, the fuel property is well determined while the engine is running without deteriorating the drivability and increasing the emission.

The property determination parameter CNpm is computed based on the dispersions UEa, UEb in cylinder torque NEtrq#i of the operation cylinders and the non-operation cylinders. Then, the fuel property is determined based on the property determination parameter CNpm. Thereby, not only the comparison between the operation cylinder and the non-operation cylinder in operating the injection condition but also the comparison between the operation cylinder and the non-operation cylinder before the injection condition operation are conducted. The fuel property is determined based on the comparison result. Thus, while canceling the error due to an individual difference of each cylinder, the fuel property can be determined. Since the cylinder torque NEtrq#i of before and after the injection condition operation are compared with each other, the influence due to the individual difference between cylinders can be eliminated. Thus, the determination accuracy of the fuel property can be enhanced.

The standard deviations σ1-σ4 representing a dispersion range of the cylinder torque NEtrq#i are computed. The cylinders of which standard deviation is minimum value are defined as the operation cylinders. In the operation cylinders, it is likely that the variation in the engine speed generated in operating the injection condition is caused due to the fuel property. Thus, by defining the operation cylinders as above, the fuel property can be accurately determined.

Other Embodiment

The present invention is not limited to the embodiments described above, but may be performed, for example, in the following manner.

In the first embodiment, the cylinders of which cylinder standard deviations σ1-σ4 are minimum value are defined as the operation cylinders. This processing may be changed as follows.

For example, as a parameter for defining the operation cylinders, a standard deviation indicating a range of dispersion in engine speed NE may be employed. In this case, the engine speed NE (instant engine speed) at a specified rotation position (for example, right after the TDC) in each cylinder is obtained. The standard deviation is computed based on a dispersion of the obtained engine speed NE. Specifically, an average value of the engine speed NE at a specified rotation position in a specified range (for example, 30 cycles) is computed. A difference between the engine speed NE and the average value is squared. A square root of an average value of the squared difference is obtained to compute the cylinder standard deviations. Then, the cylinders of which cylinder standard deviations are minimum value are defined as the operation cylinders.

Alternatively, a standard deviation of the instant torque NEflt of each cylinder is computed and the cylinders of which standard deviation is minimum value may be defined as the operation cylinders. A maximum value of the instant torque NEflt of each cylinder is sampled and the standard deviation is computed with respect to the maximum instant torque.

Alternatively, the cylinders are defined as the operation cylinders in which amplitude of torsional vibration of the crankshaft of the engine 10 is minimum value. Since the amplitude of the torsional vibration of the crankshaft is an individual characteristic of each engine, the information about torsional vibration is previously stored in the memory of the ECU 20. The operation cylinders are defined based on the information of the torsional vibration. In the cylinders of which amplitude of the torsion vibration is minimum value, it is likely that the variation in the engine speed generated in operating the injection condition is caused due to the fuel property. Thus, according to the above configuration, the fuel property can be accurately determined.

Alternatively, based on the cylinder torque NEtrq#i computed before the injection condition operation, the cylinders may be defined as the operation cylinders in which the cylinder torque NEtrq#i is maximum value. In a case that the cylinder torque NEtrq#i is different from each other between cylinders due to an individual difference of the cylinder, it is likely that the variation in engine speed due to the fuel property is most significant in the operation cylinders when the injection condition operation is conducted. Thus, according to the above configuration, the fuel property can be accurately determined.

The number of the operation cylinder may be variable. When the engine 10 is in high speed condition, a plurality of cylinders are defined as the operation cylinders. Specifically, the operation cylinder is defined according to a flowchart shown in FIG. 6. This flowchart shown in FIG. 6 is a modification of the flowchart shown in FIG. 4. In FIG. 6, the same processes as those in FIG. 4 are indicated with the same reference numerals.

When the answer is YES in step S23, the procedure proceeds to step S41.

In step S41, it is determined whether the engine 10 is currently in a specified high speed condition. For example, when the engine speed (average value of the instant engine speed) is not less than 2000 rpm, it is determined that the engine 10 is in the high speed condition. When the answer is NO in step S41, the procedure proceeds to step S42 in which a single cylinder is defined as the operation cylinder. When the answer is YES in step S41, the procedure proceeds to step S43 in which multiple cylinders (two cylinders) are defined as the operation cylinders. As described above (refer to step S24 and S25), based on the cylinder standard deviations σ1-σ4, the operation cylinders are defined. Specifically, two cylinders of which cylinder standard deviations σ1-σ4 are the minimum value and the second minimum value are defined as the operation cylinders. Alternatively, two cylinders in which the combustion successively occurs therein may be defined as the operation cylinders.

After the operation cylinder(s) is (are) defined, the injection condition operation is conducted in the operation cylinder(s) in step S26. In step S27 to step S31, the fuel property is determined based on the cylinder torque NEtrq#i in the operation cylinder(s) and the cylinder torque NEtrq#i in the non-operation cylinders. In a case that two cylinders are defined as the operation cylinders, an average value of the cylinder torque NEtrq#i of the operation cylinders is computed, and then the property determination parameter CNpm is computed according to the formulas (3) and (4).

According to the above configuration, since multiple cylinders are defined as the operation cylinders when the engine 10 is in the high speed condition, the sampling interval of the engine speed NE can be made shorter, whereby it is restricted that the fuel property determination is interrupted. When the engine 10 is in the high speed condition, the rotational inertia of the engine 10 is large. Thus, even if the number of the operation cylinder is increased, the variation in engine speed less occurs, so that the drivability is less deteriorated.

In a six-cylinder engine and an eight-cylinder engine, even if two cylinders are defined as the operation cylinders, more than half of cylinders are non-operation cylinders. Thus, in a case that the number of non-operation cylinder is greater than the number of operation cylinder, multiple cylinders can be defined as the operation cylinders.

In a case that the operation cylinders are two cylinders in which combustion occurs successively, the cylinder torque NEtrq#i of the latter cylinder may be employed as the cylinder torque NEtrq#i of the operation cylinder. Based on this cylinder torque NEtrq#i, the property determination parameter CNpm may be computed according to the formulas (3) and (4). That is, it is conceivable that the latter cylinder is more sensitive to the fuel property that the former cylinder. Thus, according to the above configuration, the determination accuracy of the fuel property can be enhanced.

In the first embodiment, the dispersion UE#i in the cylinder torque is computed based on the ratio between the cylinder torque NEtrq#i of the operation cylinders and an average value of the cylinder torque NEtrq#i of all cylinders. Alternatively, the dispersion UE#i may be computed based on an absolute value of a difference between the cylinder torque NEtrq#i of the operation cylinders and an average value of the cylinder torque NEtrq#i of all cylinders. Alternatively, the dispersion UE#i may be computed based on the cylinder torque NEtrq#i of the operation cylinders and an average value of the cylinder torque NEtrq#i of the non-operation cylinders.

The injection condition operation can be modified as follows. For example, the pilot injection quantity may be decreased, or the number of pilot injection may be varied. The combustion in the main injection depends on the combustion in the pilot injection. When the pilot injection quantity is varied, the combustion condition in the pilot injection is varied also according to the fuel property. Thus, by changing the pilot injection pattern, the fuel property can be determined.

The fuel injection condition may be operated in multiple patterns. The property determination parameter CNpm is computed in each pattern of the injection condition operation. Based on this property determination parameter CNpm, the fuel property may be determined. Specifically, when the main fuel injection timing is operated, a first property determination parameter CNpm1 is computed. When the pilot fuel injection quantity is operated, a second property determination parameter CNpm2 is computed. Based on these parameters CNpm1 and CNpm2, the fuel property is determined. For example, the fuel property is determined based on "CNpm1+CNpm2." In this case, the fuel property can be determined based on the fact that the variation in engine speed occurs when the multiple injection condition operation are conducted. Thus, its determination accuracy can be enhanced.

Each of the property determination parameter CNpm1 and CNpm2 is weighted, and then the fuel property may be determined based on the weighted parameters CNpm1 and CNpm2. In a case that the weighting coefficients are denoted by "ka" and "kb", the fuel property is determined based on "ka·CNpm1+kb·CNpm2".

The dispersion UEa in cylinder torque in injection condition operation may be defined as the property determination parameter CNpm. In this case, by comparing the property determination parameter CNpm with a determination value of the fuel property, the cetane value of the fuel is determined.

Before the injection condition operation is conducted, the ECU 20 computes the dispersion UE based on an average value of cylinder torque NEtrq#i of all cylinders and the cylinder torque NEtrq#i of each cylinder. This dispersion UE is stored in a memory along with the engine driving condition such as the engine speed NE and an engine load. When the injection condition operation is conducted, the ECU 20 reads data of the dispersion based on which the property determination parameter CNpm is computed. Thereby, the dispersion UEa and the dispersion UEb can be compared with each other under a same engine driving condition. In this case, if the operation cylinder is previously identified, the difference between the cylinder torque of the operation cylinder and the average of cylinder torque of all cylinders is computed to be stored in a memory along with the engine driving condition. It should be noted that the dispersion UEa and the dispersion UEb are not always compared with each other under the same engine driving condition.

The dispersion UE may be computed based on the engine speed NE of each cylinder. Based on this dispersion UE, the fuel property may be determined. In this case, the engine speed NE is detected at a specified rotational position in each cylinder, and the dispersion UE is computed based on a ratio between the engine speed NE of the operation cylinder and the engine speed NE of the non-operation cylinder. Then, based on this dispersion UE, the fuel property is determined. Alternatively, the fuel property may be determined based on the instant torque NEflt.

An alcohol concentration of alcohol mixed fuel can be determined as the fuel property. The present invention can be applied to a gasoline engine as well as a diesel engine.

What is claimed is:

1. A controller for an internal combustion engine applied to a fuel injection system in which a fuel injector injects fuel into each cylinder of a multicylinder engine, the controller defining a fuel injection condition of the fuel injector based on a driving condition of the engine, the controller executing a fuel injection control based on the defined injection condition with respect to each cylinder, the controller comprising:
   a computing unit configured to compute an engine speed, which varies according to a fuel combustion, with respect to each cylinder;
   an operating unit configured to operate the fuel injection condition in an operation cylinder, which is a part of the cylinders, in such a manner as to be different from the fuel injection condition in a non-operation cylinder other than the operation cylinder while the engine is running; and
   a determining unit configured to determine a cetane value, when the operating unit operates the fuel injection condition, based on an engine speed computed by the computing unit with respect to the operation cylinder and an engine speed computed by the computing unit with respect to the non-operation cylinder,
   wherein the determining unit comprises:
   a first comparing unit configured to compare the engine speed or a cylinder torque of the operation cylinder with the engine speed or the cylinder torque of the non-operation cylinder in operating the fuel injection condition; and
   a second comparing unit configured to compare the engine speed or a cylinder torque of the operation cylinder with the engine speed or the cylinder torque of the non-operation cylinder before operating the fuel injection condition, and
   the determining unit determines the cetane value based on a comparison result generated by the first comparing unit and a comparison result generated by the second comparing unit.

2. A controller for an internal combustion engine according to claim 1, further comprising:
   a dispersion computing unit configured to compute a dispersion representing a deviation range of the engine speed computed by the computing unit or a deviation range of a cylinder torque derived from the engine speed, wherein
   the operating unit defines the operation cylinder in which the dispersion is a minimum value and operates the fuel injection condition with respect to the operation cylinder.

3. A controller for an internal combustion engine according to claim 1, wherein
   the operating unit is configured to define the operation cylinder in which an amplitude of a torsional vibration of a crankshaft of the engine is a minimum value, and the operating unit operates the fuel injection condition with respect to the operation cylinder.

4. A controller for an internal combustion engine according to claim 1, wherein
   the operating unit defines the operation cylinder in which a cylinder torque computed based on the engine speed is a maximum value, and the operating unit operates the fuel injection condition with respect to the operation cylinder.

5. A controller for an internal combustion engine according to claim 1, further comprising:
   a driving condition determining unit configured to determine whether a driving condition of the engine is maintained stable, wherein
   the operating unit variably sets a number of the operation cylinder, and
   when the engine is in a high speed condition, a plurality of cylinders are defined as the operation cylinders.

6. A controller for an internal combustion engine according to claim 5, wherein
   in a case that two cylinders in which a combustion occurs successively are defined as the operation cylinders, the engine speed of the cylinder in which the combustion occurs later is defined as the engine speed of the operation cylinder, and the determination unit determines the cetane value based on the engine speed of the operation cylinder.

7. A controller for an internal combustion engine according to claim 1, wherein
   the determining unit is configured to determine the cetane value based on the ratio of a comparison result generated by the first comparing unit to a comparison result generated by the second comparing unit.

8. A controller for an internal combustion engine applied to a fuel injection system in which a fuel injector injects fuel into each cylinder of a multicylinder engine, the controller defining a fuel injection condition of the fuel injector based on a driving condition of the engine, the controller executing a fuel injection control based on the defined injection condition with respect to each cylinder, the controller comprising:
   a processing system, comprising a computer processor, the processing system being configured to at least:
   compute an engine speed, which varies according to a fuel combustion, with respect to each cylinder;
   operate the fuel injection condition in an operation cylinder, which is a part of the cylinders, in such a manner as to be different from the fuel injection condition in a non-operation cylinder other than the operation cylinder while the engine is running; and
   determine a cetane value, when the operating unit operates the fuel injection condition, based on an engine speed computed by the computing unit with respect to the operation cylinder and an engine speed computed by the computing unit with respect to the non-operation cylinder, wherein the processing system is further configured, to perform the determination, to at least:
   compare the engine speed or a cylinder torque of the operation cylinder with the engine speed or the cylinder torque of the non-operation cylinder in operating the fuel injection condition;
   compare the engine speed or a cylinder torque of the operation cylinder with the engine speed or the cylinder torque of the non-operation cylinder before operating the fuel injection condition; and
   determine the cetane value based on the ratio of a comparison result generated by the first comparing unit to a comparison result generated by the second comparing unit.

* * * * *